United States Patent
Ming

(10) Patent No.: US 10,762,338 B2
(45) Date of Patent: Sep. 1, 2020

(54) METHOD AND APPARATUS FOR DETECTING FAKE LICENSE PLATES OF VEHICLES, READABLE STORAGE MEDIUM, AND ELECTRONIC DEVICE

(71) Applicant: SHENZHEN INTELLIFUSION TECHNOLOGIES CO., LTD., Shenzhen (CN)

(72) Inventor: Zhanghui Ming, Shenzhen (CN)

(73) Assignee: SHENZHEN INTELLIFUSION TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/626,524

(22) PCT Filed: Nov. 27, 2018

(86) PCT No.: PCT/CN2018/117685
§ 371 (c)(1),
(2) Date: Dec. 25, 2019

(87) PCT Pub. No.: WO2019/105342
PCT Pub. Date: Jun. 6, 2019

(65) Prior Publication Data
US 2020/0250405 A1    Aug. 6, 2020

(30) Foreign Application Priority Data
Dec. 1, 2017    (CN) .......................... 2017 1 1248759

(51) Int. Cl.
*G06K 9/00*    (2006.01)
(52) U.S. Cl.
CPC ..... *G06K 9/00288* (2013.01); *G06K 9/00664* (2013.01); *G06K 2209/15* (2013.01)

(58) Field of Classification Search
CPC .......... G06K 9/00288; G06K 9/00664; G06K 2209/15
See application file for complete search history.

(56) References Cited

U.S. PATENT DOCUMENTS

| 6,366,222 B1 | 4/2002 | Russell, Jr. |
| 2013/0129152 A1* | 5/2013 | Rodriguez Serrano ..................... G06K 9/00791 382/105 |

(Continued)

FOREIGN PATENT DOCUMENTS

| CN | 101533557 A | 9/2009 |
| CN | 104700132 A | 6/2015 |

(Continued)

OTHER PUBLICATIONS

International Search Report issued in corresponding International application No. PCT/CN2018/117685, dated Mar. 7, 2019.

(Continued)

*Primary Examiner* — David F Dunphy

(57) ABSTRACT

A method and apparatus for detecting fake license plates of vehicles, a readable storage medium, and an electronic device are provided. The method includes: performing vehicle identification analysis and face recognition analysis on a current vehicle picture captured by a capturing unit at a current lane checkpoint, so as to obtain current vehicle information and current face information corresponding to a current vehicle, the current vehicle information including current license plate information and current vehicle structure information (S101); obtaining, according to the current license plate information, vehicle owner information corresponding to the current license plate information, obtaining, according to the current face information, driver information corresponding to the current face information, and determining whether the vehicle owner information is consistent (Continued)

with the driver information (S102); if not, obtaining vehicle information of all vehicles; and if yes, marking the current vehicle as a fake license plate vehicle (S104).

10 Claims, 3 Drawing Sheets

(56) References Cited

U.S. PATENT DOCUMENTS

2014/0201213 A1* 7/2014 Jackson .............. G06F 16/2228
707/741
2018/0089500 A1* 3/2018 Friedman ........... G06K 9/00771

FOREIGN PATENT DOCUMENTS

| CN | 106652437 A | 5/2017 |
| CN | 107967806 A | 4/2018 |

OTHER PUBLICATIONS

Written Opinion of the International Searching Authority for No. PCT/CN2018/117685, dated Mar. 7, 2019.
Initial Publication for PCT/CN2018/117685.

\* cited by examiner

Performing vehicle identification analysis and face recognition analysis on a current vehicle picture captured by a capturing unit at a current lane checkpoint, so as to obtain current vehicle information and current face information corresponding to a current vehicle, the current vehicle information including current license plate information and current vehicle structure information ~ S101

Obtaining vehicle owner information corresponding to the current license plate information, according to the determined current license plate information, obtaining driver information corresponding to the current face information, according to the current face information, and determining whether the vehicle owner information is consistent with the driver information ~ S102

If the vehicle owner information is not consistent with the driver information, obtaining vehicle information of all vehicles under a name of a driver corresponding to the driver information, and comparing the current vehicle information with the vehicle information of all the vehicles to determine whether a vehicle having structure information consistent with the current vehicle structure information and license plate information inconsistent with the current license plate information exists in all the vehicles ~ S103

And if yes, marking the current vehicle as a fake license plate vehicle ~ S104

FIG. 1

METHOD AND APPARATUS FOR DETECTING FAKE LICENSE PLATES OF VEHICLES, READABLE STORAGE MEDIUM, AND ELECTRONIC DEVICE

1. CROSS-REFERENCE TO RELATED APPLICATION

This application claims the benefit of priority from Chinese Patent Application No. 201711248759.1 entitled "METHOD AND APPARATUS FOR DETECTING FAKE LICENSE PLATES OF VEHICLES, READABLE STORAGE MEDIUM, ANI) ELECTRONIC DEVICE" and filed on Dec. 1, 2017, the content of which is hereby incorporated by reference in its entire by reference.

BACKGROUND

2. TECHNICAL FIELD

The present disclosure generally relates to vehicle detections field, and especially relates to a method and an apparatus for detecting fake license plates of vehicles, a readable storage medium, and an electronic device.

3. DESCRIPTION OF RELATED ART

With the development of the national economy, more and more families have bought motor vehicles, which is greatly convenient for their daily travel. But, as the number of vehicles increases, so does the number of violations, in this way, sonic people with fluky psychology generally use license plates in order to break road traffic laws and regulations without being punished. At the same time, vehicle owners can easily obtain fake license plates from shopping platforms or other channels, which leads to a fact that law enforcement departments are hard to detect license plates with only manual detection technology. At present, illegal activities of using fake license plates are increasingly rampant, which is seriously endangered national economic interests and rights and interests of legitimate license plate owners, at the same time, it will also seriously destroy road traffic management orders, thereby social harm can't be underestimated.

At present, vehicle capturing systems are installed on main roads, intercity checkpoints, and high-speed entrances and exits, etc, so that it can capture all passing vehicles in various complex scenes under conventional technologies, and then accurately identify license plates, models, colors, whether there are annual inspection marks, whether drivers and passengers sitting in the front are wearing safety belts or answering phone call or making a call, and so on. However, it is still difficult to determine whether the vehicle is a fake license plate vehicle through the above identified information.

SUMMARY

The technical problems to be solved: in view of the shortcomings of the related art, the present disclosure relates to a method for detecting fake license plates of vehicles which can solve the problem that the fake license plates of the vehicles can't be recognized via conventional vehicle capturing systems.

The technical solution adopted for solving technical problems of the present disclosure is:

a method for detecting fake license plates of vehicles of the present disclosure includes:

performing vehicle identification analysis and face recognition analysis on a current vehicle picture captured by a capturing unit at a current lane checkpoint, so as to obtain current vehicle information and current face information corresponding to current vehicle, the current vehicle information including current license plate information and current vehicle structure information;

obtaining vehicle owner information corresponding to the current license plate information according to the current license plate information, obtaining driver information corresponding to the current face information according to the current face information, and determining whether the vehicle owner information is consistent with the driver information;

if the vehicle owner information is not consistent with the driver information, obtaining vehicle information of all vehicles under a name of a driver corresponding to the driver information, and comparing the current vehicle information with the vehicle information of all the vehicles to determine whether a vehicle having structure information consistent with the current vehicle structure information and license plate information inconsistent with the current license plate information exists in all the vehicles; and if the vehicle having structure information consistent with the current vehicle structure information and license plate information inconsistent with the current license plate information exists in all the vehicles, marking the current vehicle as a fake license plate vehicle.

According to the method for detecting fake license plates of vehicles of the present disclosure, based on face recognition technology and vehicle recognition technology, it is mainly to analyze relationship between a captured current vehicle and a driver driving the captured current vehicle, first performing vehicle identification analysis and face recognition analysis on the captured current vehicle picture so as to obtain current vehicle information and current face information corresponding to the current vehicle, and then comparing and analyzing the current vehicle information and the current face information, respectively, obtaining vehicle owner information corresponding to the current license plate information according to the current license plate information in the current vehicle information, obtaining a corresponding driver information according to the current face information simultaneously, if the two being inconsistent, continue to query all vehicle information under the name of the driver and compare it with the current vehicle information, finally, when there is a vehicle in all vehicles under the name of the driver consistent with the current vehicle structure information and inconsistent with the current license plate information, it can be determined that the captured current vehicle is a fake license plate vehicle to mark it as a fake license plate vehicle. Thus, the method of the present disclosure can solve the problem that vehicle capture systems in the existing technology can't identify fake license plates of vehicles, and further can reduce workload of manual detection fake license plate vehicles.

In addition, according to the method for detecting fake license plates of vehicles of the present disclosure, additional technical features can be provided as follows:

furthermore, in an embodiment of the present disclosure, the step of obtaining vehicle owner information corresponding to the current license plate information according to the current license plate information, obtaining driver information corresponding to the current face information according to the current face information, and determining whether the vehicle owner information is consistent with the driver information, includes:

obtaining the vehicle owner information corresponding to the determined license plate information from a vehicle information database according to the current license plate information, the vehicle owner information including identity information of the vehicle owner;

obtaining the driver information corresponding to the current face information from a driver information database according to the current face information, the driver information including identity information of the driver; and determining whether the identity information of the vehicle owner is consistent with the identity information of the driver.

Furthermore, in an embodiment of the present disclosure, the step of obtaining vehicle information of all vehicles under a name of a driver corresponding to the driver information, includes:

determining whether there is a vehicle under the name of the driver corresponding to the current driver information; and if there is a vehicle under the name of the driver corresponding to the current driver information, determining vehicle information of all vehicles under the name of the driver corresponding to the current driver information, the vehicle information of all the vehicles including brand information, model information, color information and license plate information of each vehicle.

Furthermore, in an embodiment of the present disclosure, the current vehicle structure information includes current brand information, current model information and current color information of the current vehicle;

the step of comparing the current vehicle information with the vehicle information of all the vehicles to determine whether a vehicle having structure information consistent with the current vehicle structure information and license plate information inconsistent with the current license plate information exists in all the vehicles, includes:

comparing the brand information, the model information, the color information and the license plate information of the current vehicle with the brand information, the model information, the color information and the license plate information of each vehicle in the vehicle information of all the vehicles, one by one, to determine whether a vehicle having structure information consistent with the current vehicle structure information and license plate information inconsistent with the current license plate information exists in all the vehicles.

Furthermore, in an embodiment of the present disclosure, the method further includes:

performing the vehicle identification analysis on the current vehicle picture captured by the capturing unit at the current lane checkpoint, so as to obtain the current vehicle information corresponding to the current vehicle, the current vehicle information including current license plate information;

checking a vehicle corresponding to the current license plate according to vehicle record information in a preset time in a license plate information database, the vehicle record information including license plate information, a capturing time and a capturing location corresponding to the license plate information; and when the current license plate corresponding to the current license plate information is found in the license plate information database, and is appeared at a second checkpoint in the preset time, determining whether a fake license plate vehicle exists between the current vehicle and a vehicle corresponding to the current license plate captured at the second checkpoint, according to position information of the current lane checkpoint and the second lane checkpoint, road condition information between the current lane checkpoint and the second lane checkpoint, speed information of the current license plate and time interval of the current license plate appeared between the current lane checkpoint and the second lane checkpoint.

Furthermore, in an embodiment of the present disclosure, the capturing unit at the current lane checkpoint includes at least one supplement light for assisting fill-in light of a license plate and at least one supplement light for assisting to capture a human face; and the step of performing vehicle identification analysis and face recognition analysis on a current vehicle picture captured by a capturing unit at a current lane checkpoint, includes:

capturing the current vehicle picture by the capturing unit at the current lane checkpoint via triggering video virtual coils and outputting linkage signals of the at least one supplement light; and processing the current vehicle picture by ISP imaging control and then performing the vehicle identification analysis and the face recognition analysis on the processed current vehicle picture.

Furthermore, in an embodiment of the present disclosure, the step of performing vehicle identification analysis on a current vehicle picture captured by a capturing unit at a current lane checkpoint, includes:

extracting the vehicle information structurally from the current vehicle picture to obtain the current vehicle structure information, the current vehicle structure information at least including current brand information, current model information and current color information of the current vehicle;

performing license plate detection and recognition on the current vehicle picture to obtain the current license plate information; and summarizing the current vehicle structure information and the current license plate information to generate the current vehicle information.

Furthermore, in an embodiment of the present disclosure, the step of performing face recognition analysis on a current vehicle picture captured by a capturing unit at a current lane checkpoint, includes:

performing face detection on the current vehicle picture to determine whether there is a face; and if there is a face, determining face position in an area where the face is, and performing face feature extraction on the area where the face is, determining face size and position information of each facial organ to obtain the current face information.

An apparatus for detecting fake license plates of vehicles of the present disclosure provided to solve the problem that the fake license plates of vehicles can't be recognized by conventional vehicle capturing systems, the apparatus including:

a capturing analysis module configured to perform vehicle identification analysis and face recognition analysis on a current vehicle picture captured by a capturing unit at a current lane checkpoint, so as to obtain current vehicle information and current face information corresponding to a current vehicle, the current vehicle information including current license plate information and current vehicle structure information;

an acquiring and judging module configured to obtain vehicle owner information corresponding to the current license plate information according to the current license plate information, obtain driver information corresponding to the current face information according to the current face information, and determine whether the vehicle owner information is consistent with the driver information;

a comparing judgment module configured to obtain vehicle information of all vehicles under a name of a driver corresponding to the driver information, and compare the current vehicle information with the vehicle information of all the vehicles to determine whether a vehicle having structure information consistent with the current vehicle structure information and license plate information inconsistent with the current license plate information exists in all the vehicles, when the vehicle owner information determined by the acquiring and judging module is inconsistent with the driver information; and a marking module configured to mark the current vehicle as a fake license plate vehicle when the vehicle having structure information consistent with the current vehicle structure information and the license plate information inconsistent with the current license plate information is existed in all the vehicles determined b comparing judgment module.

A readable storage medium of the present disclosure is provided for storing computer programs which are performed by a processor to implement the steps of the method for detecting fake license plates of vehicles above mentioned.

An electronic device of the present disclosure includes a memory, a processor, computer programs stored in the memory, and a capturing unit at a lane checkpoint, the computer programs performed by the processor to implement the method for detecting fake license plates of vehicles above mentioned.

The method for detecting fake license plates of vehicles of the present disclosure, based on face recognition technology and vehicle recognition technology, is mainly to analyze relationship between a captured current vehicle and a driver driving the captured current vehicle, first performing vehicle identification analysis and face recognition analysis on the captured current vehicle picture so as to obtain current vehicle information and current face information corresponding to the current vehicle, and then comparing and analyzing the current vehicle information and the current face information, respectively, obtaining vehicle owner information corresponding to the current license plate information according to the current license plate information in the current vehicle information, obtaining a corresponding driver information according to the current face information simultaneously, if the two being inconsistent, continue to query all vehicle information under the name of the driver and compare it with the current vehicle information, finally, when there is a vehicle in all vehicles under the name of the driver consistent with the current vehicle structure information and inconsistent with the current license plate information, it can be determined that the captured current vehicle is a fake license plate vehicle to mark it as a fake license plate vehicle. Thus, the method of the present disclosure can solve the problem that vehicle capture systems in the existing technology can't identify fake license plates of vehicles, and further can reduce workload of manual detection fake license plate vehicles.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

FIG. 1 is a flowchart of the method for detecting fake license plates of vehicles in accordance with a first embodiment of the present disclosure;

DETAILED DESCRIPTION

Figure 2:
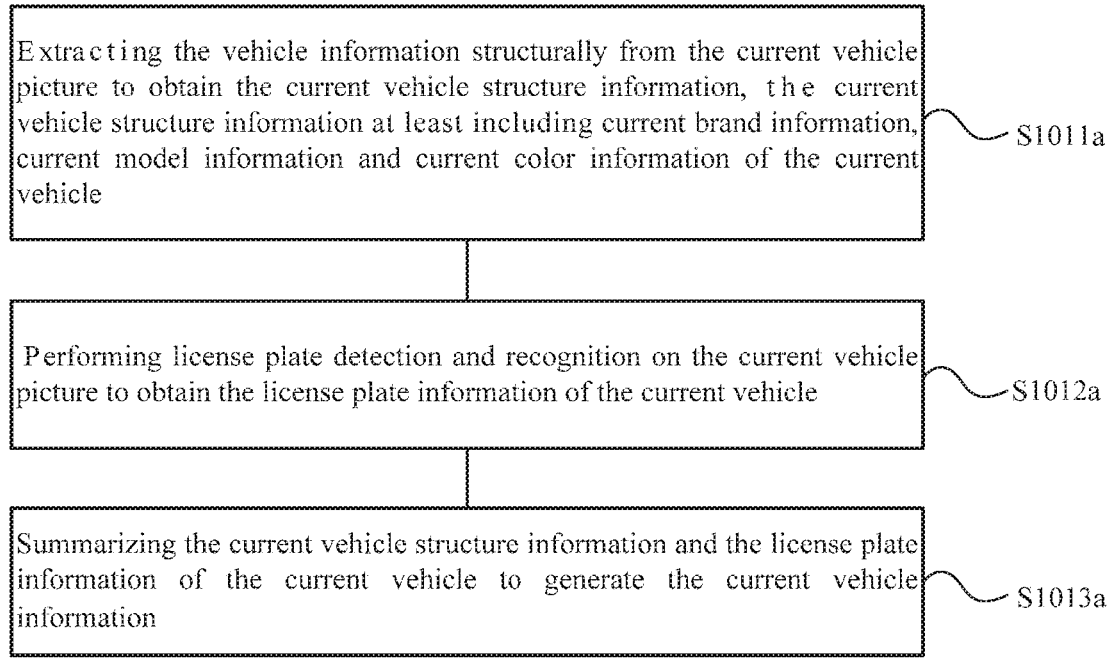
FIG. 2 is a flowchart of vehicle identification and analysis of the method for detecting fake license plates of vehicles of FIG. 1.

In order to make the above purposes, features and advantages of the present disclosure more obvious and thorough understand of the subject matter presented herein, reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described embodiment of the present disclosure, all other embodiments obtained by one of ordinary skill in the related art on the premise of no creative work are within the protection scope of the present disclosure.

Referring to FIG. 1, the method for detecting fake license plates of vehicles in accordance with a first embodiment of the present disclosure, includes:

S101, performing vehicle identification analysis and face recognition analysis on a current vehicle picture captured by a capturing unit at a current lane checkpoint, so as to obtain current vehicle information and current face information corresponding to a current vehicle, the current vehicle information including current license plate information and current vehicle structure information.

Furthermore, the current face information is face information of the driver driving the current vehicle. The capturing unit at the current lane checkpoint is usually a camera such as a seven megapixel high definition (HD) camera which can be installed on main roads, intercity checkpoints, and high-speed entrances and exits, etc. In practice, it is also necessary to equip a server for network communication with the camera, for example, the server can be a computer to receive images captured by the camera and perform data analysis and data processing on the captured images. In an embodiment of the present disclosure, the server is a main execution subject to perform all data information of the method for detecting fake license plates of vehicles. In addition, in order to ensure capturing effect, the capturing unit at the current lane checkpoint includes at least one supplement light for assisting fill-in light of a license plate and at least one supplement light for assisting to capture a human face, so as to improve capturing ability of the camera for capturing vehicles and drivers.

In step S101, the current vehicle picture is captured by the capturing unit at the current lane checkpoint via triggering video virtual coils and outputting linkage signals of the at least or supplement light, that is, virtual coils can be arranged on corresponding positions from lane checkpoints so that the virtual coils can be triggered when vehicles pass through the lane checkpoints and combined with simultaneously outputting the linkage signals of the at east one supplement light. That is, the at least one supplement light for assisting fill-in light of the license plate and assisting to capture the face can be simultaneously turned on, so that the current vehicle picture can be captured by a corresponding camera. The current vehicle picture includes an image of the current vehicle and an image of the driver driving the current vehicle. After obtaining the current vehicle picture, it can be processed via ISP (Image Signal Processing) imaging control to improve its image quality. Specifically, the current vehicle picture can also be processed by auto-focus algorithm, auto-exposure algorithm and auto-white balance algorithm, and then performed the vehicle identification analysis and the face recognition analysis on the processed current vehicle picture.

It is necessary to perform the vehicle identification analysis and the face recognition analysis respectively on the current vehicle picture.

On the first hand, referring to FIG. 2, in the process of the vehicle identification analysis, the following methods can be adopted:

S1011a, extracting the information structurally from the current vehicle picture obtain the current vehicle structure information, the current vehicle structure information at least including current brand information, current model information and current color information of the current vehicle;

Furthermore, the current vehicle structure information can be obtained via identification technology, and can also include total quality information of the current collision information of the current vehicle, and other information. Specifically, the total quality information of the current vehicle can be found in a model database according to the current brand information and the current model information, and the collision information of the current vehicle can be obtained by comparing the current vehicle in the current vehicle picture with a vehicle picture recorded in the model database.

S1012a, performing license plate detection and recognition on the current vehicle picture to obtain the current license plate information;

Furthermore, the current vehicle picture can be detected and identified via license plate number recognition technology. It can be pointed out that the license plate number recognition technology can also be integrated into the capturing unit (that is, integrated into the camera) at the current lane checkpoint, because it is relatively mature, S1013a, summarizing the current vehicle structure information and the current license plate information to generate the current vehicle information;

Finally, the current vehicle information can be obtained via summarizing the current vehicle structure information and the current license plate information.

Figure 3:
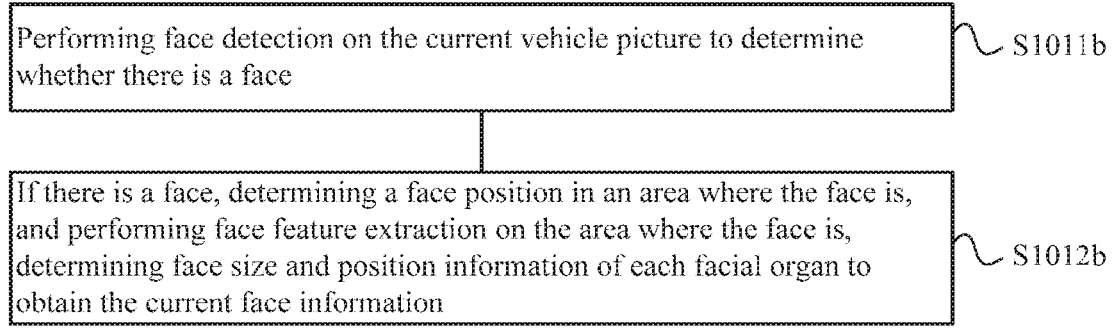
FIG. 3 is a flowchart of face recognition analysis of the method for detecting fake license plates of vehicles of FIG. 1.

On the second hand, referring to FIG. 3, in the process of the vehicle identification analysis, it can include the followings below:

S1011b, performing face detection on the current vehicle picture to determine whether there is a face;

S1012b, if there is a face, determining face position in an area where the face is, performing face feature extraction on the area where the face is, and determining face size and position information of each facial organ to obtain the current face information.

In the actual implementation, an area where the driver is, that is, a pixel range near a seat of the driver, can be firstly determined in the current vehicle picture, and then the face detection via face detection algorithm based on deep neural network can be performed on the current vehicle picture to determine whether there is a face. If there is a face, it can further perform face feature extraction from the area where the face is, determine the face position, the face size and the position information of various facial organs, and finally obtain the current face information.

S102, obtaining the vehicle owner information corresponding to the current license plate information according to the current license plate information, obtaining the driver information corresponding to the current face information according to the current face information, and determining whether the vehicle owner information is consistent with the driver information;

Furthermore, both the license plate information and the vehicle owner information corresponding to the license plate information are stored in a vehicle information database. Both the face information of the driver and the driver information corresponding to the face information are stored in a driver information database. Both the vehicle information database and the driver information database can be integrated with each other during the concrete implementation.

A specific implementation can be adopted from the following:

obtaining the vehicle owner information corresponding to the determined license plate information from the vehicle information database according to the current license plate information, the vehicle owner information including identity information of the vehicle owner;

obtaining the driver information corresponding to the current face information from the driver information database according to the current face information, the driver information including identity information of the driver;

determining whether the identity information of the vehicle owner is consistent with the identity information of the driver.

Furthermore, the identity information can include relevant information of resident identity cards.

S103, if the vehicle owner information is inconsistent with the driver information, obtaining the vehicle information of all vehicles under a name of a driver corresponding to the driver information, and comparing the current vehicle information with the vehicle information of all the vehicles to determine whether a vehicle having e structure information consistent with the current vehicle structure information and the license plate information inconsistent with the current license plate information exists in all vehicles;

Furthermore, if the current vehicle owner information is inconsistent with the current driver information, that is, the vehicle owner corresponding to the current license plate information isn't driving the current vehicle, and then, the vehicle information of all the vehicles under the name of the driver corresponding to the current driver information from the driver database can he obtained via the server, which can be implemented in the following:

determining whether there is a vehicle under the name of the driver corresponding to the current driver information;

if there is a vehicle under the name of the driver corresponding to the current driver information, determining vehicle information of all vehicles under the name of the driver corresponding to the current driver information, the vehicle information of all the vehicles including brand information, model information, color information and license plate information of each vehicle.

After obtaining the above information, comparing the brand information, the model information, the color information and the license plate information of the current vehicle with the brand information, the model information, the color information and the license plate information of each vehicle in the vehicle information of all the vehicles, one by one, to determine whether a vehicle having structure information consistent with the current vehicle structure information and license plate information inconsistent with the current license plate information exists in all the vehicles.

S104, if there is a vehicle having the structure information consistent with the current structure information and the license plate information inconsistent with the current license plate information exists in all the vehicles, marking the current vehicle as a fake license plate vehicle.

Furthermore, if it is determined that there is a vehicle under the name of the driver consistent with the current vehicle structure information, but inconsistent with the current license plate information, since information of all the vehicles under the name of the driver stored in the vehicle/driver databases is correct, the current captured vehicle can be identified as a fake license plate vehicle and then it can be marked as the fake license plate vehicle.

Furthermore, as an embodiment of the present disclosure, if the current vehicle is determined as the fake license plate vehicle, the relevant information of the current vehicle and its driver driving the current vehicle can be stored for subsequent forensic analysis by the police, or warning messages can be actively pushed to the police.

According to the method for detecting fake license plates of vehicles of the present disclosure, based on face recognition technology and vehicle recognition technology, it is mainly to analyze relationship between a captured current vehicle and a driver driving the captured current vehicle, first performing vehicle identification analysis and face recognition analysis on the captured current vehicle picture so as to obtain current vehicle information and current face information corresponding to the current vehicle, and then comparing and analyzing the current vehicle information and the current face information, respectively, obtaining vehicle owner information corresponding to the current license plate information according to the current license plate information in the current vehicle information, obtaining a corresponding driver information according to the current face information simultaneously, if the two being inconsistent, continue to query all vehicle information under the name of the driver and compare it with the current vehicle information, finally, when there is a vehicle in all vehicles under the name of the driver consistent with the current vehicle structure information and inconsistent with the current license plate information, it can be determined that the captured current vehicle is a fake license plate vehicle to mark it as a fake license plate vehicle. Thus, the method of the present disclosure can solve the problem that vehicle capture systems in the existing technology can't identify fake license plates of vehicles, and further can reduce workload of manual detection fake license plate vehicles.

Figure 4:
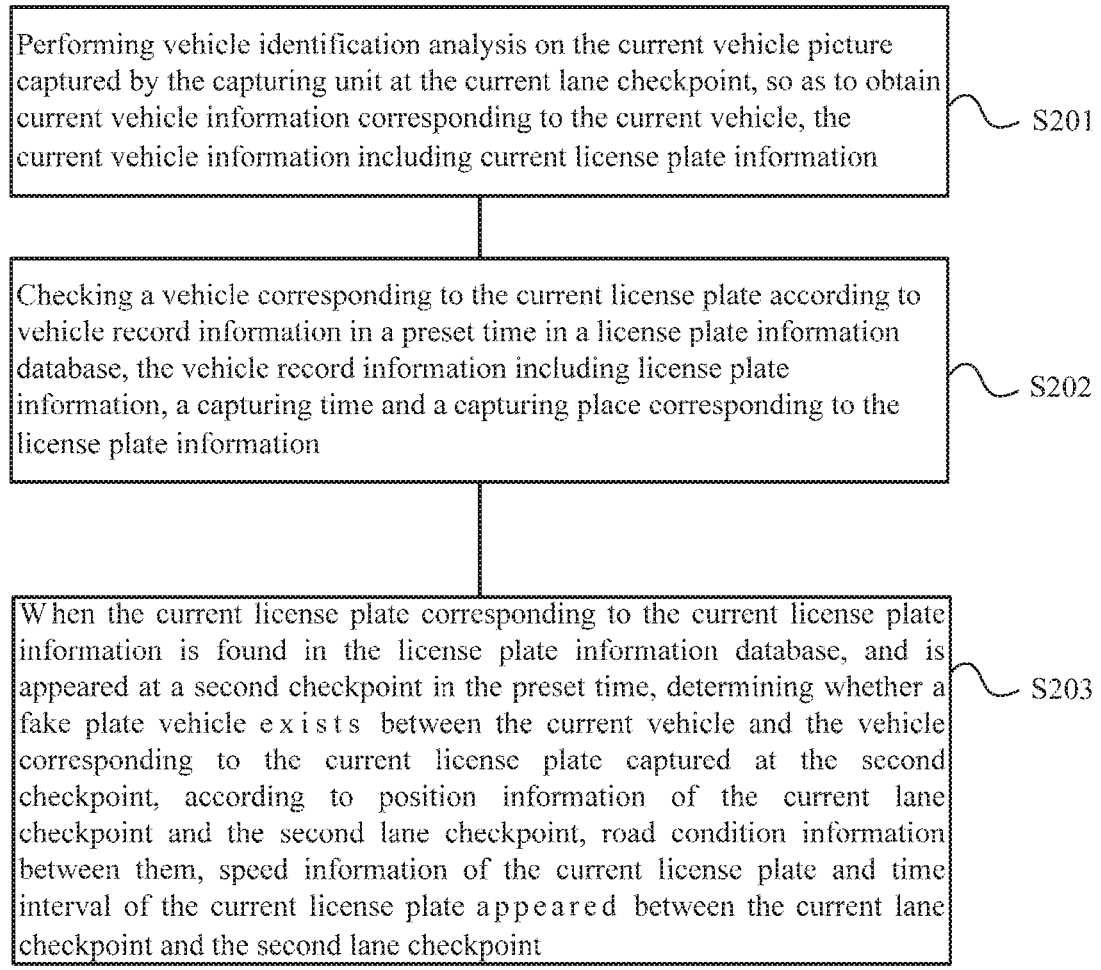
FIG. 4 is a flowchart of the method for detecting fake license plates of vehicles in accordance with a second embodiment of the present disclosure.

Referring to FIG. 4, the method for detecting fake license plates of vehicles according to a second embodiment of the present disclosure, includes:

S201, performing vehicle identification analysis on the current vehicle picture captured by the capturing unit at the current lane checkpoint, so as to obtain current vehicle information corresponding to the current vehicle, the current vehicle information including current license plate information;

Furthermore, in this step, the capturing unit at the lane checkpoint, the vehicle identification and analysis method and its realization process are same as that of the first embodiment, in this embodiment, it is highlighted the difference from the first embodiment, and the same and similar parts in each embodiment referred to each other are not repeatedly described.

S202, checking a vehicle corresponding to the current license plate according to vehicle record information in a preset time in a license plate information database, the vehicle record information including the license plate information, a capturing time and a capturing location corresponding to the license plate information;

In the embodiment of the present disclosure, the license plate information database can be pre-stored in the server, and all the vehicles captured at the lane checkpoint can be stored and analyzed in the license plate information database via big data processing technology. In the specific implementation, the lane checkpoint can be limited within a certain range in order to reduce the amount of data processing, for example, all the captured vehicle pictures in a certain province or a certain city are stored and analyzed, from which a corresponding license plate information is extracted and recorded, and its capturing time and its capturing location are also recorded so that captured data are continuously accumulated and stored to form big data. The current license plate information captured in real time is then compared with the vehicle record information in the license plate information database. In actual implementation, a time range of comparison can be limited, such as comparing the current license plate with the vehicle record information in the license plate information database within nearly one hour.

S203, when the current license plate corresponding to the current license plate information is found in the license plate information database, and is appeared at a second checkpoint in the preset time, determining whether fake license plate vehicle exists between the current vehicle and a vehicle corresponding to the current license plate captured at the second checkpoint, according to position information of the current lane checkpoint and the second lane checkpoint, road condition information between the current lane checkpoint and the second lane checkpoint, speed information of the current license plate and time interval of the current license plate appeared between the current lane checkpoint and the second lane checkpoint.

Furthermore, if the current license plate found in the license plate information database is also appeared in the second lane checkpoint in the preset time, first obtaining the time and the location of the current license plate appeared in the second lane checkpoint, and then according to position information of the current lane checkpoint and the second lane checkpoint, road condition information between the current lane checkpoint and the second lane checkpoint, speed information of the current license plate and time interval of the current license plate appeared between the current lane checkpoint and the second lane checkpoint, determining possibility of a same vehicle appeared in two lane checkpoints within the time interval, which can be analyzed via a corresponding calculation formula or an exclusive method in the specific implementation, For example, the distance between the current lane checkpoint and the second lane checkpoint is 200 kilometers, the time that the current license plate is appeared in the current second lane checkpoint is 10:00 am, while the time that the current license plate is also appeared in the current lane checkpoint is 10:20 am on a same day, in this way, it is impossible for a same vehicle to appear in the two lane checkpoints respectively according to the above two times. Therefore, it can be determined that there is a fake license plate vehicle between the current vehicle and the vehicle corresponding to the current license plate captured at the second lane checkpoint. So, the analysis result can be pushed to the police for further analysis. The second embodiment of the present disclosure, as a supplement to the first embodiment of the present disclosure, is provided for improving detection efficiency of fake license plate vehicles and further reducing workload of manual detection of fake license plate vehicles via narrowing detection ranges of fake license plate vehicles.

It can be noted that the method provided in this embodiment is also applicable to conditions in which no judgment can be made in the first embodiment, specifically including the following below:

first, the current vehicle owner information is consistent with the current driver information;

second, the driver driving the current vehicle does not have a driver's license, that is, there is no information about the driver in the vehicle/driver databases;

third, the driver has a driver's license but no vehicle exits under his or her name; and fourth, the driver has vehicles under or her name, but none consistent with the current vehicle structure information, and inconsistent with the current license plate information.

For the above conditions, the method of the second embodiment can be used for supplementary detection, so as to improve detection efficiency of fake license plate vehicles and further reducing workload of manual detection of fake license plate vehicles.

Figure 5:
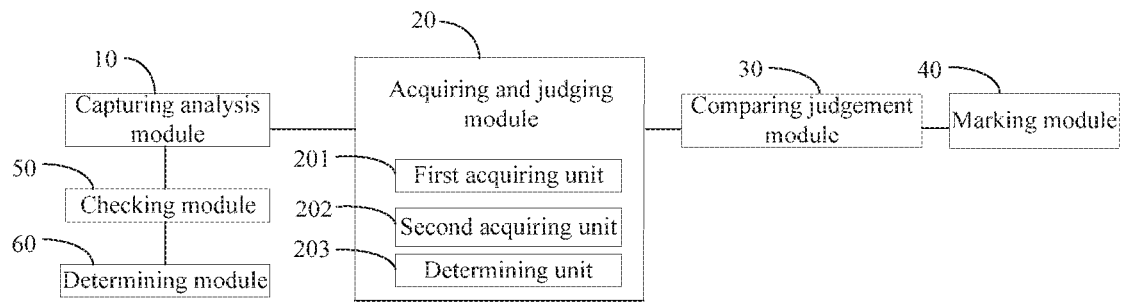
FIG. 5 is a block diagram of an apparatus for detecting fake license plates of vehicles in accordance with a third embodiment of the present disclosure.

Referring to FIG. 5, based on a same inventive concept, an apparatus for detecting fake license plates of vehicles in accordance with a third embodiment includes:

a capturing analysis module 10 configured to perform vehicle identification analysis and face recognition analysis on a current vehicle picture captured by a capturing unit at a current lane checkpoint, so as to obtain current vehicle information and current face information corresponding to a current vehicle, the current vehicle information including current license plate information and current vehicle structure information;

an acquiring and judging module 20 configured to obtain vehicle owner information corresponding to the current license plate information according to the current license plate information, obtain driver information corresponding to the current face information according to the current face information, and determine whether the vehicle owner information is consistent with the driver information;

a comparing judgment module 30 configured to obtain vehicle information of all vehicles under a name of a driver corresponding to the driver information, and compare the current vehicle information with the vehicle information of all the vehicles to determine whether a vehicle having structure information consistent with the current vehicle structure information and license plate information inconsistent with the current license plate information exists in all the vehicles, when the vehicle owner information determined by the acquiring and judging module is inconsistent with the driver information; and a marking module 40 configured to mark the current vehicle as a fake license plate vehicle when the vehicle having structure information consistent with the current vehicle structure information and the license plate information inconsistent with the current license plate information exists in all the vehicles determined by the comparing judgment module.

In an embodiment of the present disclosure, the acquiring and judging module 20 includes:

a first acquiring unit 201 configured to obtain the vehicle owner information corresponding to the determined license plate information from the vehicle information database according to the current license plate information, the vehicle owner information including identity information of the vehicle owner;

a second acquiring unit 202 configured to obtain the driver information corresponding to the current face information from the driver information database according to the current face information, the driver information including identity information of the driver;

a determining unit 203 configured to determine whether the identity information of the vehicle owner is consistent with the identity information of the driver.

in an embodiment of the present disclosure, the comparing judgment module 30 is specifically configured to:

determine whether there are vehicles under the name of the driver corresponding to the current driver information;

if there are vehicles under the name of the driver corresponding to the current driver information, determining vehicle information of all vehicles under a name of a driver corresponding to the driver information, the vehicle information of all the vehicles including brand information, model information, color information and license plate information of each vehicle.

In an embodiment of the present disclosure, the current vehicle structure information includes current brand information, current model information and current color information of the current vehicle.

The comparing judgment module 30 is also configured to:

compare the brand information, the model information, the color information and the license plate information of the current vehicle with the obtained brand information, the obtained model information, the obtained color information and the obtained license plate information of each vehicle in the vehicle information of all the vehicles, one by one, to determine whether a vehicle having the structure information consistent with the current vehicle structure information and the license plate information inconsistent with the current license plate information exists in all the vehicles.

In an embodiment of the present disclosure, the apparatus for detecting fake license plates of vehicles further includes:

a checking module 50 configured to check the vehicle corresponding to the current license plate according to vehicle record information in a preset time in a license plate information database, the vehicle record information comprising license plate information, a capturing time and a capturing location corresponding to the license plate information; and a determining module 60 configured to: determine whether a fake license plate vehicle exists between the current vehicle and a vehicle corresponding to the current license plate captured at the second checkpoint, according to position information of the current lane checkpoint and the second lane checkpoint, road condition information between the current lane checkpoint and the second lane checkpoint, speed information of the current license plate and time interval of the current license plate appeared between the current lane checkpoint and the second lane checkpoint, when the current license plate corresponding to the current license plate information is found in the license plate information database, and is appeared at a second checkpoint in the preset time.

In an embodiment of the present disclosure, the capturing unit at the current lane checkpoint includes at least one supplement light for assisting fill-in light of a license plate and at least one supplement light for assisting to capture a human face.

The capturing analysis module 10 is specifically configured to:

capture the current vehicle picture by the capturing unit at the current lane checkpoint via triggering video virtual coils and outputting linkage signals of the at least one supplement light; and process the current vehicle picture by ISP imaging control and then perform the vehicle identification analysis and the face recognition analysis on the processed current vehicle picture.

In an embodiment of the present disclosure, the capturing analysis module 10 is further configured to:

extract the vehicle information structurally from the current vehicle picture to obtain the current vehicle structure information, the current vehicle structure information at least including the current brand information, the current model information and the current color information of the current vehicle;

perform license plate detection and recognition on the current vehicle picture to obtain the current license plate information; and summarize the current vehicle structure information and the current license plate information to generate the current vehicle information.

In an embodiment of the present disclosure, the capturing analysis module 10 is further configured to:

perform face detection on the current vehicle picture to determine whether there is a face, and if there is a face, determine face position in an area where the face is, perform face feature extraction on the area where the face is, and determine face size and position information of each facial organ to obtain the current face information.

The technical characteristics and technical effects of the apparatus for detecting fake license plates of vehicles shown in the embodiment of the present disclosure are same as that of the method of the present disclosure, which are not described and stated herein.

Furthermore, a readable storage medium in accordance with an embodiment of the present disclosure is provided for storing computer programs which are performed by a processor to implement the steps of the above method for detecting fake license plates of vehicles.

Furthermore, an electronic device in accordance with an embodiment of the present disclosure includes a memory, a processor, computer programs stored in the memory, and a capturing unit at a lane checkpoint, the computer programs performed by the processor to implement the steps of the above method for detecting fake license plates of vehicles.

The logic and/or steps expressed in the flowchart or otherwise described here, for example, a sequence table of executable instructions thought as performing logical functions can be executed in any computer-readable medium, used for instruction execution systems, apparatuses, devices (such as computer-based systems, systems with processors or other systems that can take and execute instructions from instruction execution systems, apparatuses, or devices), or a combination thereof For the description of the present disclosure, a "computer readable medium" can be any device which can include, store, communicate, propagate, or transmit programs for instruction execution systems, apparatuses, devices or a combination thereof More specific examples (non-exhaustive list)of a computer readable medium include e following: electrical connection parts (electronic devices) with one or more wires, portable computer disks (magnetic devices), random access memories (RAMs), read-only memories (ROMs), erasable and editable read-only memories (EPROMs or flash memories optical fiber devices, and portable optical disk read-only memories (CDROMs). In addition, a computer readable medium can even be a paper or other suitable mediums on which the program can be printed, because the programs can be obtained electrically such as by optical scanning of the paper or other mediums, and then be followed by editing, interpretation or other appropriate ways (if necessary), and finally stored in computer memories.

It can be understood that each part of the present disclosure can be implemented with hardware, software, firmware or a combination thereof. In the above embodiments, a plurality of steps or methods can be implemented via software or firmware stored in the memory and performed by appropriate instruction execution systems. For example, if implemented by hardware, same as another embodiment, it can be performed via one of the following technologies, or a combination of them known in the related art: discrete a logic circuit with a logic gate circuit configured to perform logic functions on data signals, a special integrated circuit with a suitable combination logic gate, a programmable gate array (PGA) and a field programmable gate array (FPGA), etc.

In the description of the present disclosure, the references to "an embodiment", "some embodiments", "an example", "specific examples", and "some examples" etc means to specific characteristics, structures or characters described in the embodiments or examples in particular combinations should be contained in at least one embodiment or example of the present disclosure. A schematic description of the above references does not necessarily refer to the same embodiment or example, also does not refer to the embodiments that are independent and exclusive embodiments with other embodiments or alternative embodiments. It can be understood both explicitly and implicitly by one of ordinary skill in the related art that the embodiments described herein can be combined in an appropriate manner in any one or more embodiments or examples.

What is claimed is:

1. A method for detecting fake license plates of vehicles comprising:

performing vehicle identification analysis and face recognition analysis on a current vehicle picture captured by a capturing unit at a current lane checkpoint, so as to obtain current vehicle information and current face information corresponding to a current vehicle, the current vehicle information comprising current license plate information and current vehicle structure information;

obtaining vehicle owner information corresponding to the current license plate information, according to the current license plate information, obtaining driver information corresponding to the current face information, according to the current face information, and determining whether the vehicle owner information is consistent with the driver information;

if the vehicle owner information is not consistent with the driver information, obtaining vehicle information of all vehicles under a name of a driver corresponding to the driver information, and comparing the current vehicle information with the vehicle information of all the vehicles to determine whether a vehicle having structure information consistent with the current vehicle structure information and license plate information inconsistent with the current license plate information exists in all the vehicles; and if the vehicle having structure information consistent with the current vehicle structure information and license plate information inconsistent with the current license plate information exists in all the vehicles, marking the current vehicle as a fake license plate vehicle.

2. The method for detecting fake license plates of vehicles as claimed in claim 1, wherein the step of obtaining vehicle owner information corresponding to the current license plate information, according to the current license plate information, obtaining driver information corresponding to the current face information, according to the current face information, and determining whether the vehicle owner information is consistent with the driver information, comprises:

obtaining the vehicle owner information corresponding to the license plate information from a vehicle information database, according to the current license plate information, the vehicle owner information comprising identity information of the vehicle owner;

obtaining the driver information corresponding to the current face information from a driver information database, according to the current face information, the driver information comprising identity information of the driver; and determining whether the identity information of the vehicle owner is consistent with the identity information of the driver.

3. The method for detecting fake license plates of vehicles as claimed in claim 1, wherein the step of obtaining vehicle information of all vehicles under a name of a driver corresponding to the driver information, comprises:

determining whether there is a vehicle under the name of the driver corresponding to the current driver information;

if there is a vehicle under the name of the driver corresponding to the current driver information, determining vehicle information of all vehicles under the name of the driver corresponding to the current driver information, the vehicle information of all the vehicles comprising brand information, model information, color information and license plate information of each vehicle.

4. The method for detecting fake license plates of vehicles as claimed in claim 3, wherein the current vehicle structure information comprises current brand information, current model information and current color information of the current vehicle; and the step of comparing the current vehicle information with the vehicle information of all the vehicles to determine whether a vehicle having structure information consistent with the current vehicle structure information and license plate information inconsistent with the current license plate information exists in all the vehicles, comprises:

comparing the brand information, the model information, the color information and the license plate information of the current vehicle with the brand information, the model information, the color information and the license plate information of each vehicle in the vehicle information of all the vehicles, one by one, to determine whether a vehicle having structure information consistent with the current vehicle structure information and license plate information inconsistent with the current license plate information exists in all the vehicles.

5. The method for detecting fake license plates of vehicles as claimed in claim 1, wherein the method further comprises:

performing the vehicle identification analysis on the current vehicle picture captured by the capturing unit at the current lane checkpoint, so as to obtain the current vehicle information corresponding to the current vehicle, the current vehicle information comprising current license plate information;

checking a vehicle corresponding to the current license plate according to vehicle record information in a preset time in a license plate information database, the vehicle record information comprising license plate information, a capturing time and a capturing location corresponding to the license plate information; and when the current license plate corresponding to the current license plate information is found in the license plate information database, and is appeared at a second checkpoint in the preset time, determining whether a fake license plate vehicle exists between the current vehicle and a vehicle corresponding to the current license plate captured at the second checkpoint, according to position information of the current lane checkpoint and the second lane checkpoint, road condition information between the current lane checkpoint and the second lane checkpoint, speed information of the current license plate and time interval of the current license plate appeared between the current lane checkpoint and the second lane checkpoint.

6. The method for detecting fake license plates of vehicles as claimed in claim 1, wherein the capturing unit at the current lane checkpoint comprises at least one supplement light for assisting fill-in light of a license plate and at least one supplement light for assisting to capture a human face; and the step of performing vehicle identification analysis and face recognition analysis on a current vehicle picture captured by a capturing unit at a current lane checkpoint, comprises:

capturing the current vehicle picture by the capturing unit at the current lane checkpoint via triggering video virtual coils and outputting linkage signals of the at least one supplement light; and processing the current vehicle picture by ISP imaging control and then performing the vehicle identification analysis and the face recognition analysis on the processed current vehicle picture.

7. The method for detecting fake license plates of vehicles as claimed in claim 6, wherein the step of performing vehicle identification analysis on a current vehicle picture captured by a capturing unit at a current lane checkpoint, comprises:

extracting the vehicle information structurally from the current vehicle picture to obtain the current vehicle structure information, the current vehicle structure information at least comprising current brand information, current model information and current color information of the current vehicle;

performing license plate detection and recognition on the current vehicle picture to obtain the current license plate information; and summarizing the current vehicle structure information and the current license plate information to generate the current vehicle information.

8. The method for detecting fake license plates of vehicles as claimed in claim 7, wherein the step of performing face recognition analysis on a current vehicle picture captured by a capturing unit at a current lane checkpoint, comprises:

performing face detection on the current vehicle picture to determine whether there is a face; and if there is a face, determining face position in an area where the face is, and performing face feature extraction on the area where the face is, determining face size and position information of each facial organ to obtain the current face information.

9. An apparatus for detecting fake license plates of vehicles comprising:

a capturing analysis module configured to perform vehicle identification analysis and face recognition analysis on a current vehicle picture captured by a capturing unit at a current lane checkpoint, so as to obtain current vehicle information and current face information corresponding to a current vehicle, the current vehicle information comprising current license plate information and current vehicle structure information;

an acquiring and judging module configured to obtain vehicle owner information corresponding to the current license plate information, according to the current license plate information, obtain driver information corresponding to the current face information, according to the current face information, and determine whether the vehicle owner information is consistent with the driver information;

a comparing judgment module configured to obtain vehicle information of all vehicles under a name of a driver corresponding to the driver information, and compare the current vehicle information with the vehicle information of all the vehicles to determine whether a vehicle having structure information consistent with the current vehicle structure information and license plate information inconsistent with the current license plate information exists in all the vehicles, when the vehicle owner information determined by the acquiring and judging module is inconsistent with the driver information; and a marking module configured to mark the current vehicle as a fake license plate vehicle when the vehicle having structure information consistent with the current vehicle structure information and the license plate information inconsistent with the current license plate information exists in all the vehicles determined by the comparing judgment module.

10. An electronic device comprising: a memory, a processor, and computer programs stored in the memory, the computer programs performed by the processor to implement performing vehicle identification analysis and face recognition analysis on a current vehicle picture captured by a capturing unit at a current lane checkpoint, so as to obtain current vehicle information and current face information corresponding to a current vehicle, the current vehicle information comprising current license plate information and current vehicle structure information;

obtaining vehicle owner information corresponding to the current license plate information, according to the current license plate information, obtaining driver information corresponding to the current face information, according to the current face information, and determining whether the vehicle owner information is consistent with the driver information;

if the vehicle owner information is not consistent with the driver information, obtaining vehicle information of all vehicles under a name of a driver corresponding to the driver information, and comparing the current vehicle information with the vehicle information of all the vehicles to determine whether a vehicle having structure information consistent with the current vehicle structure information and license plate information inconsistent with the current license plate information exists in all the vehicles; and if the vehicle having structure information consistent with the current vehicle structure information and license plate information inconsistent with the current license plate information exists in all the vehicles, marking the current vehicle as a fake license plate vehicle.

* * * * *